UNITED STATES PATENT OFFICE.

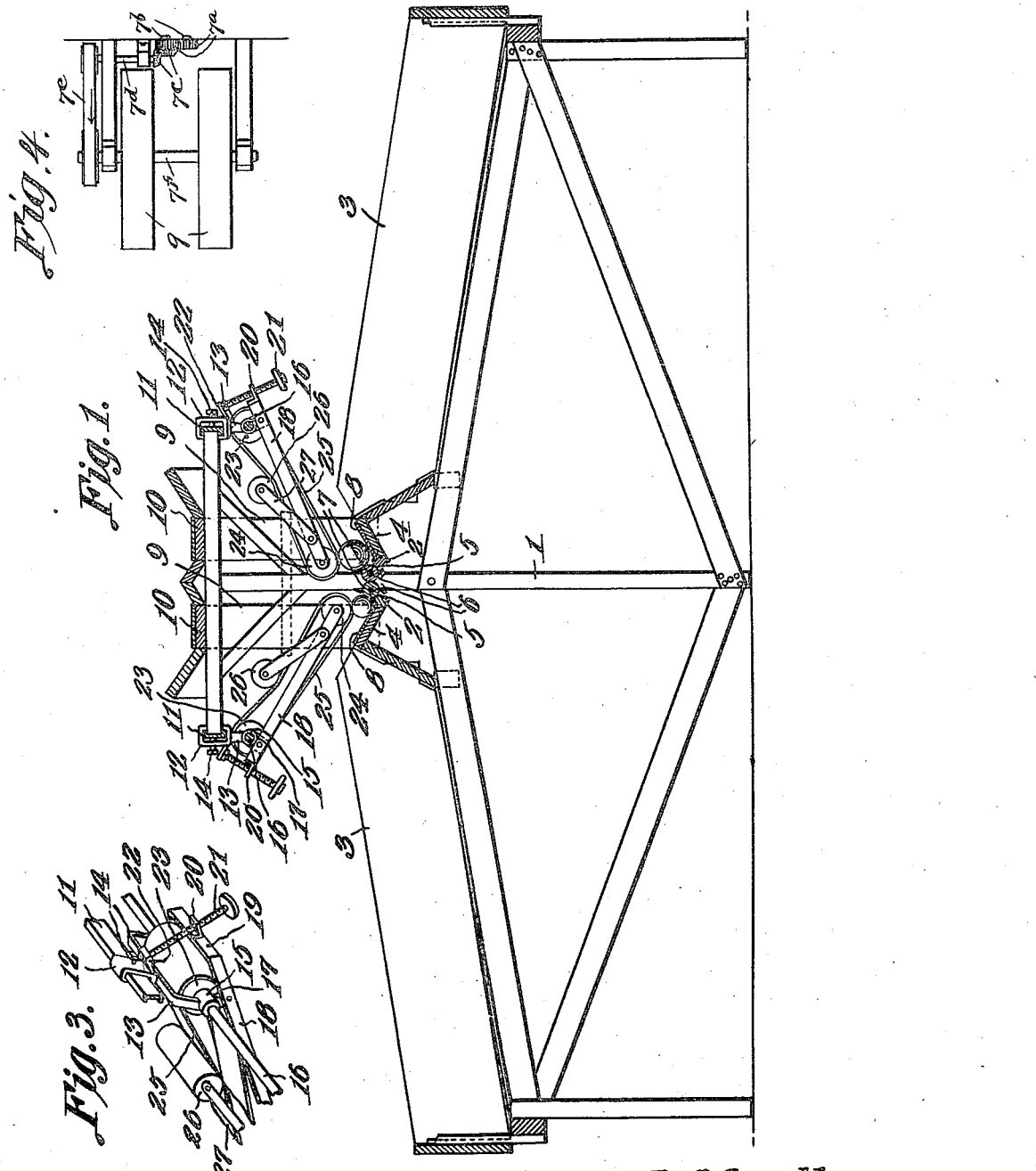
J. L. MAULL.
FRUIT SORTING MACHINE.
APPLICATION FILED SEPT. 2, 1914.
1,124,486.
Patented Jan. 12, 1915.
2 SHEETS—SHEET 1.
James L. Maull,
Inventor

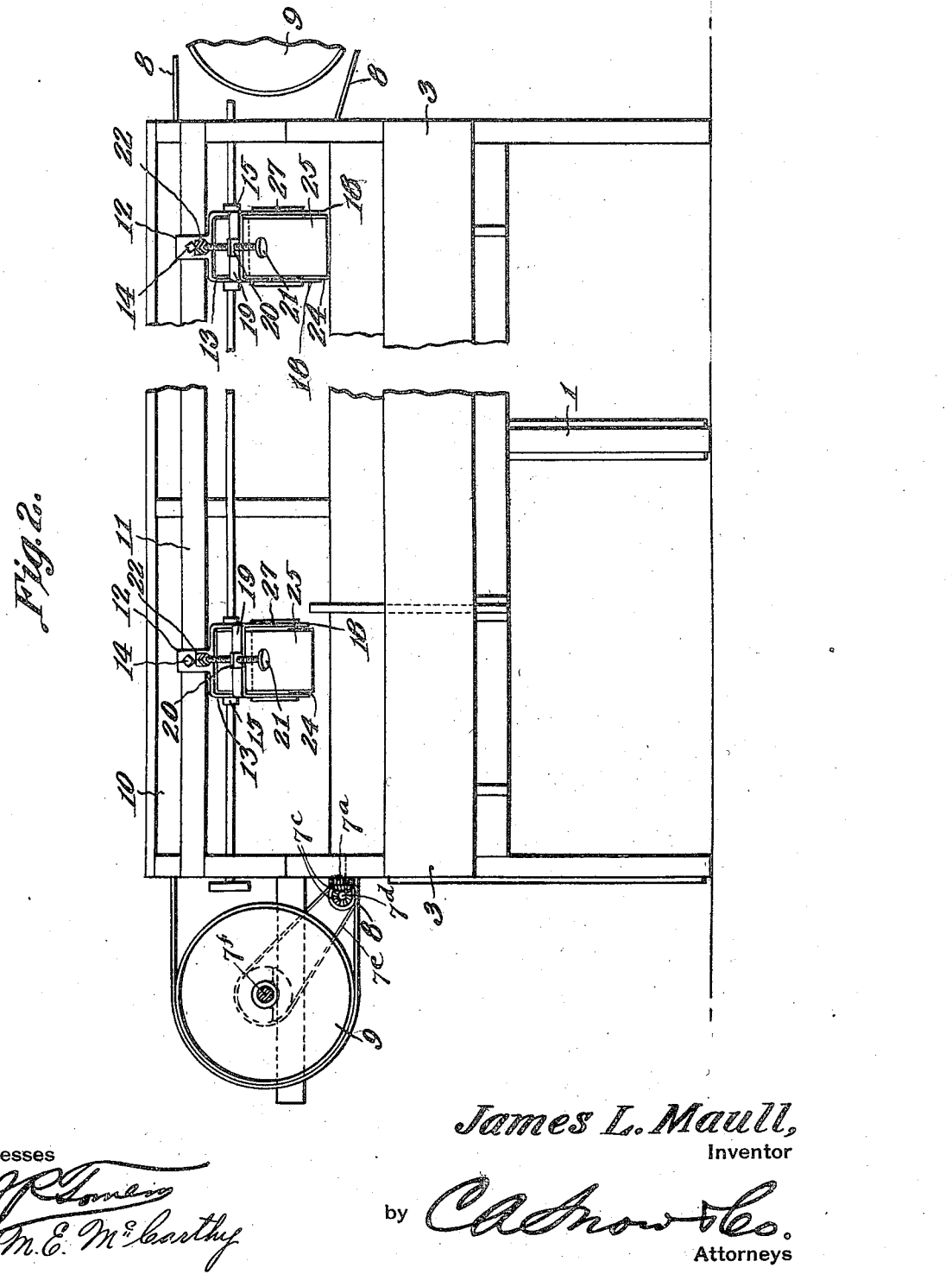

JAMES L. MAULL, OF CRESCENT CITY, FLORIDA.

FRUIT-SORTING MACHINE.

1,124,486. Specification of Letters Patent. Patented Jan. 12, 1915.

Application filed September 2, 1914. Serial No. 859,879.

*To all whom it may concern:*

Be it known that I, JAMES L. MAULL, a citizen of the United States, residing at Crescent City, in the county of Putnam and State of Florida, have invented a new and useful Fruit-Sorting Machine, of which the following is a specification.

The present invention appertains to fruit sorters, or graders, and aims to provide a novel and improved machine or apparatus for sorting or sizing fruit, the present invention being particularly an improvement over the fruit sorting machine disclosed in my copending application, Serial No. 798,121 filed October 29, 1913.

The present invention contemplates the provision in a fruit sorting machine, of novel means for feeding or conveying the fruit to the gaging and ejecting devices, in connection with means for rotating the fruit about varying axes, in order that the fruit will be graded and ejected according to the largest diameter thereof.

Another object of the invention is to provide a unique gage and ejecting device, which will be adjustable to engage and eject fruit of various diameters from the feeder or conveyer. It is also within the scope of the present invention, to provide a fruit sorting apparatus which will be improved generally in its construction, to enhance the utility thereof, and whereby the desired objects will be carried out in an efficacious manner.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:

Figure 1 is a cross section of the machine. Fig. 2 is a side elevation thereof, portions being broken away. Fig. 3 is a fragmental perspective view of one of the gaging and ejecting devices. Fig. 4 is a fragmental view illustrating the actuating means for the rollers.

In carrying out the invention there is provided a suitable supporting frame or structure 1, which carries a pair of juxtaposed longitudinal troughs 2, at its central portion, and it also carries a series of troughs or bins 3 at the opposite sides, leading downwardly from the troughs 2 to receive the sorted or graded fruit ejected from the troughs 2. Each of the troughs 2 is of V-shaped cross section and has its outer side 4 inclined laterally at a relatively small angle, while the inner side 5 of each trough is inclined at a relatively large angle and is provided with a longitudinal slot 6 within which is rotatable a longitudinal roller 7. The rollers 7 are disposed between the inner sides of the troughs 2 and have their peripheral portions working within the slots or openings 6 so as to be exposed upon the interior of the troughs 2.

Conveyer or feed belts 8 have their lower runs movable upon the outer sides 4 of the troughs 2, and are trained over suitable pulleys 9 carried by the ends of the frame 1, the upper runs of the belts 8 passing along the upper troughs or channels 10 carried by the frame 1. The lower runs of the belts 8 resting upon the outer sides 4 of the troughs 2, are inclined laterally away from the rollers 7, said rollers and lower runs of the belts 8 being parallel and forming troughs themselves for receiving the fruit.

Any suitable means may be provided for actuating the rollers 7. Thus, the arbitrary actuating means shown in the drawings, embodies a pair of intermeshing spur gears $7^a$ secured upon the ends of the shaft $7^b$ of the rollers 7, one of the shafts $7^b$ being connected by means of intermeshing bevel gears $7^c$ with a counter shaft $7^d$, and the counter shaft $7^d$ is in turn connected by means of a belt $7^e$ to the driving shaft $7^f$ upon which the corresponding pair of pulleys 9 are mounted. Thus, when the driving shaft $7^f$ is rotated to actuate the conveyer belt, the rollers 7 will be properly rotated.

A series of gaging and ejecting devices is employed in connection with each of the troughs 2, it being noted that the feeding and gaging devices are duplicated at the opposite sides of the machines. The two series of gaging and ejecting devices are carried by longitudinal rails 11 carried by the upper portion of the machine, at the opposite sides thereof, the rails 11 being formed from channel iron or the like. Each of the gaging and ejecting devices includes a slide 12 slidably embracing the corresponding rail 11, and having a depending yoke or inverted U-shaped hanger 13, and a set screw 14 is engaged through the slide 12 for clamping it at any position along the respective rail 11 to which it has been slid. The limbs of the yoke or hanger 13 are provided with bearings 15 through which a rotatable shaft 16 is journaled, there being one of the shafts 16 at each side of the machine and disposed below the respective rail 11 parallel therewith.

The bearings 15 of the yoke or hanger 13 are provided with downwardly projecting extensions or ears 17, to which are pivoted a pair of levers or bars 18 which are connected at one end by a yoke or cross piece 19 adjacent the slide or carrier 12. The yoke or cross piece 19 is provided with a lug or ear 20 through which is threaded an adjusting screw 21, the upper end or tip of the screw 21 bearing against an extension or lug 22 projecting from the lower portion of the slide or carrier 12, whereby the inner ends of the levers 18 will be supported against downward movement.

Each of the gaging and ejecting devices further includes a pulley 23, feathered upon the corresponding shaft 16 within the yoke or hanger 13, a pulley 24 journaled or trunnioned between the inner or free ends of the levers or bars 18, and an endless belt or apron 26 trained around the pulleys 23 and 24. The belt 25 is maintained taut by means of an idler 26 resting upon the upper run of the belt and carried by links 27 pivoted to the levers or bars 18.

Any number of the gaging and ejecting devices may be employed at the opposite sides of the machine, to sort the oranges or other fruit in the desired number of sizes or grades, and to eject the fruit from the troughs 2 into the bins 3. The pulleys 24 carried by the free ends of the levers 18, are disposed above the troughs 2 in coöperative relation therewith and with the rollers 7, and the levers 18 and belts 25 carried thereby are inclined outwardly or toward the slides or carriers 12. The lower runs of the belts 25 are approximately parallel with the outersides of the troughs 2, and the shafts 16 are rotated in such directions as to cause the lower runs of the belts 25 to move outwardly or away from the rollers 7 and the sides 5 of the troughs 2. The rollers 7 are rotated so that those portions thereof which project into the troughs 2, move upwardly or toward the belts 25, to tend to rotate the fruit in the same direction as the lower runs of the belts 25 will when they engage the fruit. The belts 8 are actuated so that their lower runs move from one end of the frame to the other to feed or convey the fruit longitudinally along the troughs 2, and before operating the machine, the several gaging and ejecting devices are adjusted or set properly in order that the largest sized fruit will first be ejected and that the remaining fruit will be successively ejected according to their smaller diameters. To adjust the gaging and ejecting devices, it is only necessary to rotate the screws 21 which are carried by the outer arms of the levers 18, and which bear upwardly against the lugs 22 of the slides or carriers 12, to support the inner arms of the levers 18. It is evident that when the screws 21 are rotated in one direction, they will raise the inner arms of the levers 18 to move the inner pulleys 24 away from the troughs 2, and when the screws 21 are rotated in the other directions, it will enable the inner arms of the levers 18 to swing downwardly so as to bring the pulleys 24 and the inner portions of the belts closer to the troughs 2. By loosening the set screws 14, the slides or carriers 12 may also be slid longitudinally along the rails 11, to position the gaging and ejecting devices at various longitudinal points, it being noted that the pulleys 23 are feathered upon the shafts 16 in order that they may move longitudinally with the yokes or hangers 13.

In operation, the oranges or other fruit or commodities to be sorted or sized are run into the forward ends of the troughs 2 and will be taken up and conveyed rearwardly within the said troughs by the feed or conveyer belts 8. The fruit resting upon the belts 8 will not only be carried rearwardly, but will bear or lean against the rollers 7, and those portions of the rollers which are engaged by the fruit in moving upwardly, will tend to roll the fruit about horizontal or longitudinal axes parallel with the axes of the rollers 7. The fruit in leaning against the rollers 7 and being carried rearwardly by the belts 8, will also tend to rotate about axes perpendicular to the belts 8, and thereby tend to spin upon the belts and roll against the rollers 7. Consequently, the fruit while being conveyed or carried rearwardly will be constantly caused to rotate about varying axes, so that the largest diametered fruit will be brought upright to engage the gaging devices to eject the fruit according to the major or largest diameters.

Inasmuch as the successive pulleys 24 of the several gaging and ejecting devices are arranged closer to the troughs 2, from the front end to the rear end of the machine, the fruit passing under the first pair of gaging devices, will cause the largest fruit to encounter or engage the lower runs of the corresponding gaging and ejecting belts 25 and as a result the largest fruit will be rolled laterally off of the belts 8 to be ejected into the corresponding bins 3. In this connection, it is to be observed that the rollers 7 tend to rotate the fruit in such a direction that when the fruit is engaged by the lower runs of the belts 25, the fruit will be readily rolled off of the belts 8 by the ejecting belts 25. As the fruit pass along the machine, the successive smaller sizes of fruit will be engaged and ejected by the respective engaging and ejecting devices, into the proper bins from which the fruit may be taken according to their various sizes or grades.

The feeding or conveying and engaging devices, being duplicated at the opposite sides of the machine, enables two kinds or species of fruit to be sorted or sized at the same time, if desired, and due to the peculiar construction of the present apparatus, the same is of advantage in other respects as will be obvious without further comment.

Having thus described the invention, what is claimed as new is:—

1. In a sorting machine, a longitudinally movable conveyer, a longitudinal rotatable roller disposed adjacent the said conveyer for rolling the articles carried thereby, and a gaging and ejecting device disposed above the conveyer and including means movable away from said roller.

2. In a fruit sorting machine, a longitudinally movable laterally inclined conveyer, a longitudinal roller disposed adjacent the conveyer whereby the articles carried by the conveyer will lean against the roller, the roller being rotated so that that portion engaged by the articles will move upwardly, and a gaging and ejecting device disposed above the conveyer and including means movable away from the said roller.

3. In a fruit sorting machine, a trough, a conveyer belt movable longitudinally upon one side of the trough, the other side of the trough having a longitudinal slot, a roller mounted to rotate within the said slot to be engaged by the articles carried by the belt, and a gaging and ejecting device mounted above the trough and including means movable away from the said roller.

4. In a fruit sorting machine, a trough of V-shaped cross section, one side of the trough inclined at a relatively small angle, and the other side of the trough being inclined at a relatively large angle and having a longitudinal slot, a conveyer belt movable longitudinally upon the first mentioned side of the trough, a roller mounted for rotation within the said slot to be engaged by the articles carried by the belt, and a gaging and ejecting device mounted above the trough and including means movable away from the said roller.

5. In a fruit sorting machine, a conveyer, and a gaging and ejecting device mounted thereabove and coöperable therewith, the said device including a carrier, a shaft journaled through the carrier, a lever fulcrumed to the carrier, a pulley carried by the shaft, a pulley carried by the lever above the said conveyer, a belt trained around the said pulleys, and means for adjusting the lever relative to the carrier.

6. In a fruit sorting machine, a conveyer, and a gaging and ejecting device disposed thereabove and coöperable therewith, the said device including a carrier, a shaft journaled through the carrier, a lever fulcrumed to the carrier, a pulley carried by the shaft, a pulley carried by one arm of the lever above the conveyer, a belt trained around the said pulleys, and an adjusting screw carried by the other arm of the lever and adapted to bear against the carrier for supporting the first mentioned arm of the lever.

7. In a fruit sorting machine, a conveyer, and a gaging and ejecting device disposed thereabove and coöperable therewith, the said device including a yoke, a shaft journaled through the said yoke, a pair of levers fulcrumed to the arms of the yoke, a pulley carried by certain arms of the levers above the conveyer, a pulley carried by the shaft within the said yoke, a belt trained around the said pulleys, a cross bar connecting the other arms of the levers, and an adjusting screw carried by the said cross bar adapted to rest against the said carrier for supporting the first mentioned arms of the levers.

8. In a sorting machine, a conveyer, and a gaging and ejecting device mounted above and coöperable with the conveyer, the said device including a rail, a slide mounted upon the said rail and having a depending yoke, a shaft journaled through the said yoke, a pair of levers fulcrumed to the limbs of the yoke, a pulley journaled between certain arms of the said levers above the conveyer, a pulley feathered upon the said shaft within the yoke, a belt trained around the pulleys, a cross bar connecting the other arms of the levers, and an adjusting screw carried by the said cross bar and resting against the slide.

In testimony that I claim the foregoing as my own, I have hereto affixed my signature in the presence of two witnesses.

JAMES L. MAULL.

Witnesses:
F. M. DURRANCEY,
E. WRAY WHARTON.